Aug. 2, 1927.
T. SHIPLEY
1,637,920
METHOD OF REMOVING OIL FROM EVAPORATING SYSTEMS
Filed Jan. 26, 1926
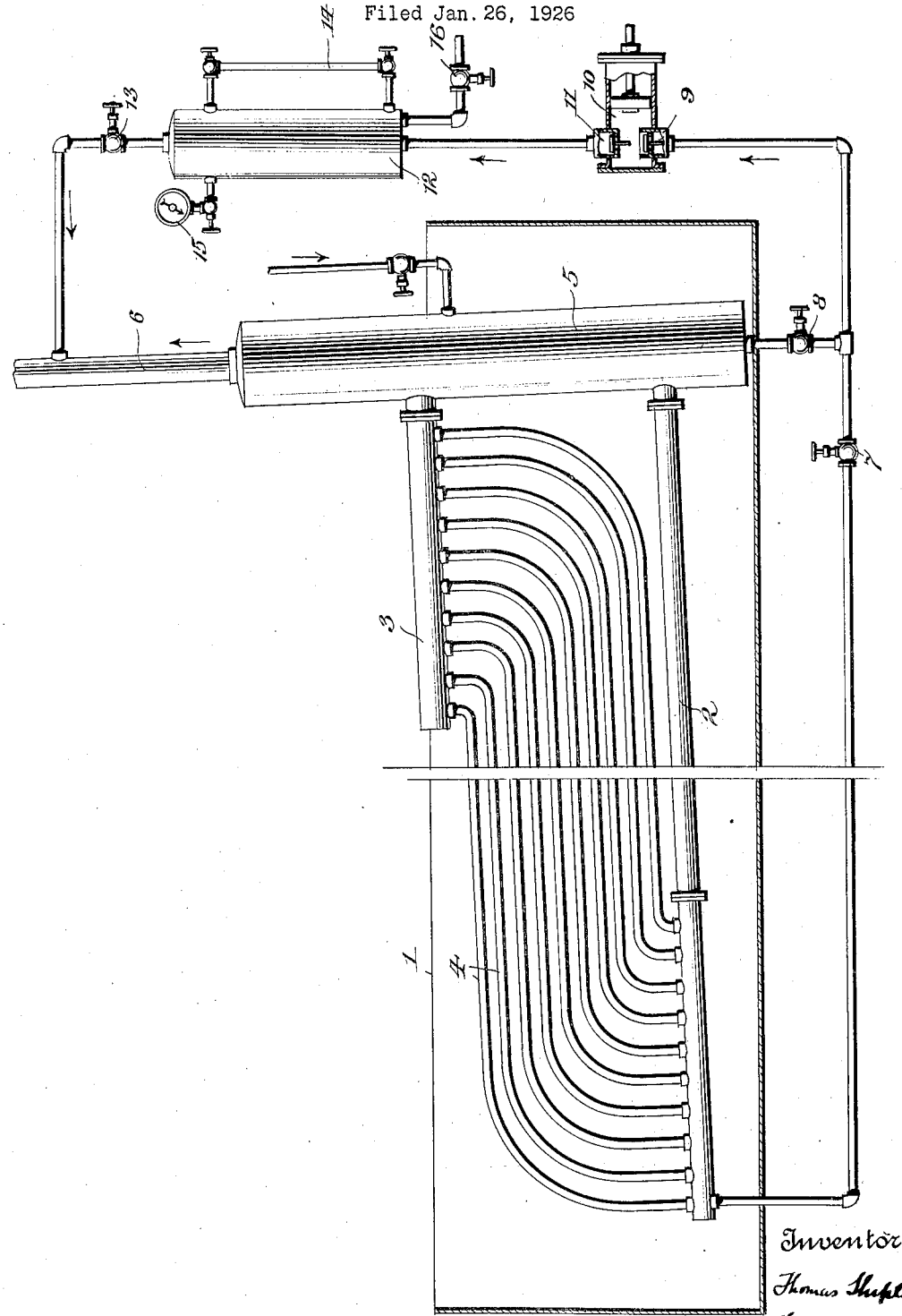
Inventor
Thomas Shipley
by
Dodge and Sons
Attorneys Patented Aug. 2, 1927.

1,637,920

UNITED STATES PATENT OFFICE.

THOMAS SHIPLEY, OF YORK, PENNSYLVANIA, ASSIGNOR TO SHIPLEY PATENT CORPORATION, OF YORK, PENNSYLVANIA, A CORPORATION OF DELAWARE.

METHOD OF REMOVING OIL FROM EVAPORATING SYSTEMS.

Application filed January 26, 1926. Serial No. 83,936.

This invention relates to a method of and apparatus for removing oil from the evaporators of refrigerating systems.

Oil from the compressor is carried over by the refrigerant into the evaporator, and there slowly collects. This oil must from time to time be drawn off. The usual method heretofore has been to blow it off to the atmosphere through a blow down connection at the bottom of the evaporator. The loss of refrigerant thus entailed is only one of the disadvantages. The evaporation of liquid ammonia mixed with the oil chills the latter to the point of solidification rendering complete oil removal extremely difficult if not impossible. In fact it is usually necessary to shut down the plant and allow the evaporator coils to warm up so that the oil will be warm enough initially to be blown out before it solidifies. Oil removal by the former standard practice thus involved heavy expense.

According to the present invention, I draw the oil from the bottom of the evaporator and deliver it, preferably by means of a pump, to a closed chamber at evaporator pressure, or at a slightly higher pressure. This chamber has a valve controlled connection to the suction line and with the evaporator. After the chamber is charged with oil, and whatever liquid refrigerant accompanies it, the chamber is isolated from the evaporator and the refrigerant is caused to boil off slowly to the suction line. The chamber is then isolated from the suction line as well as from the evaporator and when the oil is warm enough to flow freely it is salvaged by draining it from the chamber to another container.

In the drawing I illustrate in elevation and part section the application of my invention to an evaporator forming part of an ordinary ammonia system.

The brine tank is shown at 1. The evaporator consists of a liquid header 2, a gas header 3 and connecting pipes 4. The headers 2 and 3 are connected to a drum 5 which serves as a trap to prevent liquid refrigerant from passing to the suction line 6 and also to maintain the pipes 4 flooded. The arrangement described so far is merely a known type of evaporator and brine tank.

From the low end of the liquid header 2 and from the bottom of drum 5 there are connections controlled by stop valves 7 and 8 respectively. These lead to the suction, or inlet valve 9 of a reciprocating pump 10. This may be operated manually or otherwise. Its discharge valve 11 is connected to deliver into the bottom of a drum 12 whose top is connected by way of stop valve 13 with the suction line 6. The drum 12 is equipped with sightglass 14, pressure gage 15 and valved drain connection 16.

Assuming that oil has accumulated in liquid header 2 or in the bottom of drum 5 (or in both), the valve 7 or the valve 8 (or both) is opened, the valve 13 is opened slightly and the pump 10 is operated to transfer the oil to drum 12. It will be observed that this drum 12 is remote from the brine tank and so located that heat may readily be absorbed by oil in the drum. The pump 10 is ordinarily necessary because in most plants there is no convenient location for the drum 12 below liquid header 2. In case of such location gravity flow may be availed of.

When the oil is drawn off into drum 12 this is isolated from the evaporator; i. e. both valve 7 and valve 8 are closed. The valve 13 is properly adjusted. It may be opened wide, but it is better merely to "crack" it sufficiently to maintain a pressure in drum 12 about five pounds higher than that in suction line 6. This retards evaporation of such liquid refrigerant as is in drum 12. Consequently the oil is not so chilled as it would be by more rapid evaporation of the refrigerant, and while the refrigerant boils off more slowly the disengagement of refrigerant from the oil is more complete, because of the greater fluidity of the oil.

This method saves all the oil, wastes no refrigerant, and does not require the shutting down of the plant. By disengaging the refrigerant from the oil at a controlled rate and at a point remote from the evaporator it is possible to effect this disengagement at such temperature as insures fluidity of the oil and consequent complete separation.

What is claimed is:

1. The method of recovering oils from the evaporators of refrigerating systems, which consists in drawing oil from the evaporator with such liquid refrigerant as incidentally accompanies it, isolating such oil and refrigerant from the evaporator at approximately evaporator pressure, causing such refrigerant to boil off from the oil at such restricted rate as to maintain the fluidity of the oil, and separately recovering the refrigerant and oil.

2. The method of recovering oils from the evaporators of refrigerating systems having a suction line, which consists in drawing oil from the evaporator with such liquid refrigerant as incidentally accompanies it, confining such oil and refrigerant at a point remote from the evaporator at approximately evaporator pressure, causing such refrigerant to boil off from the oil to the suction line, and finally discharging the oil.

3. The method of recovering oil from the evaporators of refrigerating systems including a suction line which consists in pumping the oil and admixed liquid refrigerant from the evaporator; confining the oil and refrigerant at a pressure slightly above the suction pressure of the system at a point remote from the evaporator and there causing slow evaporation of the refrigerant and flow of the resulting vapor to the suction line; and finally discharging the oil.

4. The combination with an evaporator and connected suction line, of a closed container; a valve controlled connection from the bottom of the evaporator to said container; means for causing oil to flow from the evaporator to said container through the last named connection; a valve controlled connection from the container to the suction line and a valve controlled drain from said container.

5. The combination with an evaporator and connected suction line of a closed container; a valve controlled connection from the top of said container to the suction line; a connection from the bottom of the evaporator to said container; a pump interposed in the last named connection; and a valve controlled drain for said container.

In testimony whereof I have signed my name to this specification.

THOMAS SHIPLEY.